Figure 1:
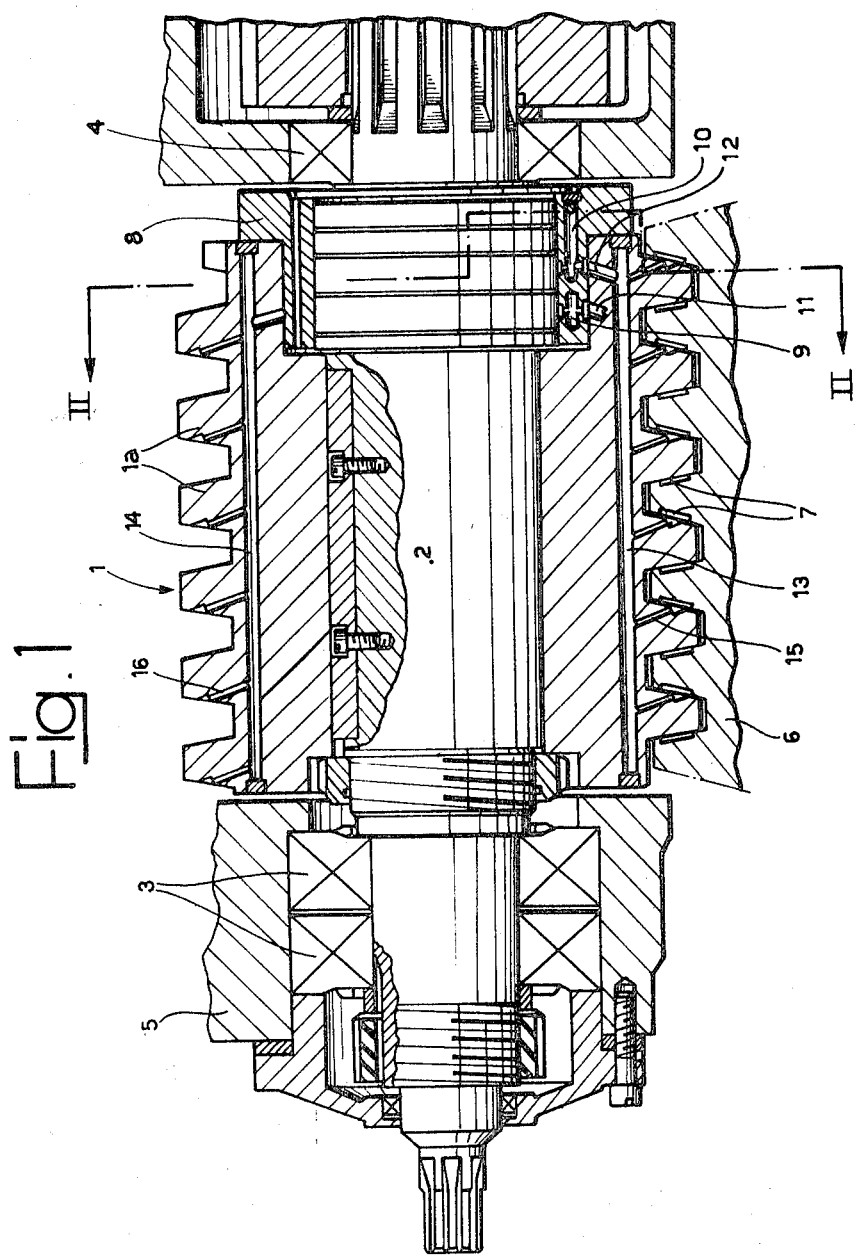

United States Patent
Galbarini et al.

[15] 3,651,706
[45] Mar. 28, 1972

[54] LEAD SCREW DEVICE

[72] Inventors: Maso Galbarini, Pavia; Francesco Cotta Ramusino, Milan, both of Italy

[73] Assignee: Innocenti Societe Generale L'Industria Metallurgica E Meccanica, Milan, Italy

[22] Filed: Apr. 16, 1970

[21] Appl. No.: 29,205

[30] Foreign Application Priority Data

Apr. 17, 1969 Italy....................51468 A/69

[52] U.S. Cl...................74/410, 74/422, 74/424.6, 74/467
[51] Int. Cl..................F16h 57/00, F16h 1/18, F16h 57/04
[58] Field of Search............74/424.6, 422, 410, 467, 424.8

[56] References Cited

UNITED STATES PATENTS

| | | |
|---|---|---|
| 3,415,138 | 12/1968 | Rumbarger et al..............74/424.6 X |
| 3,424,022 | 1/1969 | Greenberg et al..................74/410 X |
| 3,448,631 | 6/1969 | Sullivan................................74/410 X |
| 3,361,003 | 1/1968 | Hodgson..............................74/424.6 |
| 3,323,385 | 6/1967 | Revitt.....................................74/425 |

*Primary Examiner*—Leonard H. Gerin
*Attorney*—Sughrue, Rothwell, Mion, Zinn & Macpeak

[57] ABSTRACT

A device having a lead screw and a grooved block the grooves of which form a threaded portion for cooperation with the thread of the lead screw. The lead screw has internal passages with outlets at the thread faces for supplying a hydrostatic support fluid, such as a lubricating oil, to the interface between cooperating threads. The side walls of the grooves have recesses into which the hydrostatic support fluid can flow from the said passageways. A distributor valve is provided for supplying the hydrostatic fluid only to the passageways which at any time are communicating with the recesses in the grooved block.

1 Claim, 2 Drawing Figures

LEAD SCREW DEVICE

This invention relates to devices in which a member is movable with respect to a lead screw and particularly devices in which there is hydrostatic support between the lead screw and the member movable with respect thereto. The member may comprise a nut movable along the lead screw or a grooved block the grooves of which act as a thread engaging with only a portion of the circumference of the lead screw. Alternatively the nut or block may be fixed and the lead screw mounted for movement. The hydrostatic support allows fine adjustment of the position of the nut or grooved block along the lead screw by providing low friction and absence of the phenomenon called "stick-slip" due to the difference between the dynamic and static coefficient of friction for the materials concerned. To this effect the fluid used to provide the hydraulic support preferably comprises a lubricating oil.

One problem which arises when a grooved block is used as the movable member concerns the distribution of fluid under pressure to the engaged region of the threads of the lead screw. Normally the fluid is fed along channels within the lead screw which lead to one or both faces of the threads. In the case of a grooved block the hydrostatic support is obtained by selectively connecting the channels which lead to the engaged part of the faces of the threads with a source of fluid under pressure by means of a distributor valve placed at the end of the screw.

However, the commutation carried out by the distributor valve causes variations in the number of engaged threads, due to variations in the number of communicating channels, and consequently a variation of the useful thrust or, if a uniform thrust is maintained, there is a variation of pressure between the threads and the grooves.

According to the present invention there is provided a device having a lead screw and a grooved block the grooves of which form a threaded portion for cooperation with part of the thread of the lead screw, the lead screw being rotatable to cause axial relative movement between itself and the grooved block and having a plurality of internal passages terminating in outlets at the faces of the threads for supplying a hydrostatic support fluid to the interface between cooperating threads characterized in that the side walls of the grooves are provided with recesses into which the hydrostatic fluid under pressure can flow from the internal passages in the lead screw.

Preferably the device has a distributor valve for selectively supplying hydrostatic support fluid under pressure to the internal passages of the lead screw which lead to the part of the thread cooperating with the grooved block and is characterized in that the distributor valve is adapted to connect the source of hydrostatic fluid under pressure to the internal passages which lead to an outlet communicating with a recess in the side wall of a groove in the grooved block.

Figure 2:
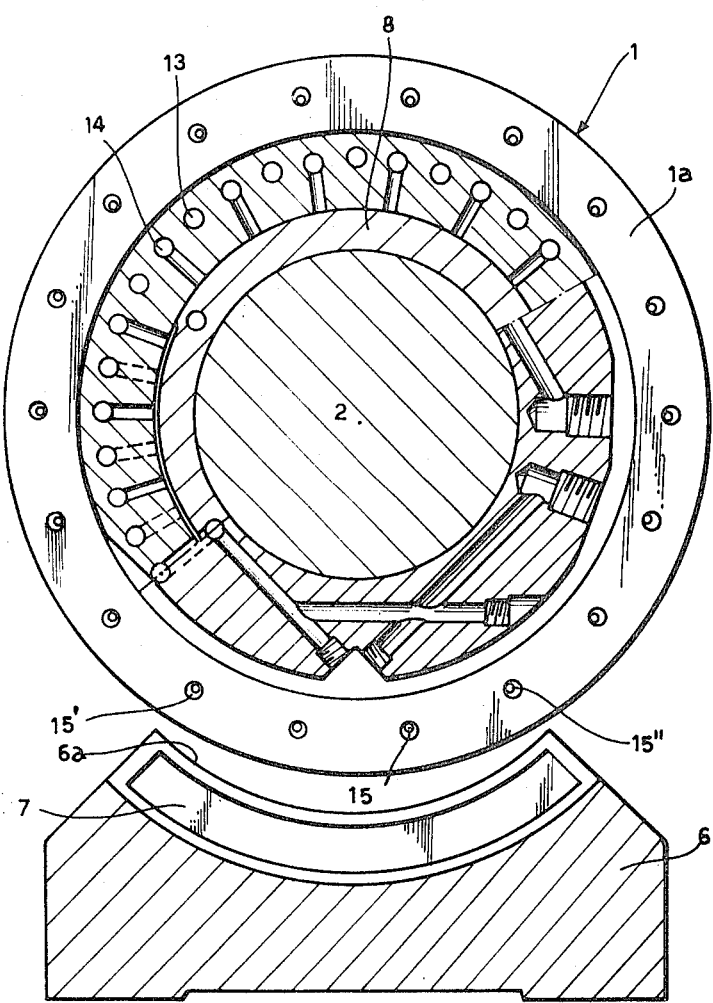

One embodiment of the invention will now be described, by way of example with reference to the accompanying drawings, in which:

FIG. 1 is an axial section of a hydrostatically supported screw device according to this invention, and FIG. 2 is a transverse exploded section, on the line 2—2 of FIG. 1.

In FIG. 1 there is shown a lead screw 1 fixed to a shaft 2, which is supported by rolling and thrust bearings 3 and 4, on a fixed support 5 such as, for example, a mobile trolley of a machine-tool. The shaft 2 is connected at one of its ends to means for causing rotational movement and cooperates with a fixed grooved block 6 whose grooves 6a are so shaped as to closely engage with the threads 1a of the lead screw 1. The side walls of the grooves 6a are formed with recesses 7 which extend the whole length of the face of the groove 6a stopping before the ends thereof.

The supporting fluid is fed through a distributor valve 8 between the screw 1 and the shaft 2. The distributor valve 8 has groups of passageways 9, 10 which are put in communication, by the rotation of the screw 1 and the shaft 2, with corresponding radial passages 11, 12 of the screw 1, to feed the support fluid only to that part of the screw thread which is engaged with the block 6. The radial passages 11, 12 of the screw communicate with longitudinal passages 13, 14 each of which is connected to a number of holes 15, 16 which open into the two opposite faces of the threads 1a of the screw.

In this way the support fluid is fed into the recesses 7 in the side walls of the grooves 6a of the block 6 through the holes 15 or 16 according to the case. Regardless of the number of holes 15, 16 which open into each recess 7 at any given instant, the pressure and the thrust do not vary since the support fluid can spread its thrust over the whole surface of the recess 7 so that there is at least one intermediate hole engaged in the groove (see FIG. 2), the two outside holes 15', 15'' can be disconnected from the source of support fluid before leaving the recess 7 and after entering it, eliminating the necessity of having a precise changeover, this simplifies the construction of the distributor 8 and increases its sealing.

Naturally, still keeping to the principle of this invention, the forms of realization and the details of construction can be amply varied, in respect to what has been described and illustrated, without departing from the spirit and scope of the invention.

What is claimed is:

1. A hydrostatically supported lead screw assembly comprising:

a rotatable lead screw having a plurality of internal passages therein, one set of internal passages passing longitudinally along the length of said lead screw radially inwardly of the threaded portion thereof, a second set of internal passages extending in a generally radial direction outwardly from said longitudinal passages and terminating in outlets on the faces of the threads of said lead screw for supplying a hydrostatic support fluid to the interface between cooperating threads; a grooved block, the grooves of which form a cooperating thread portion for cooperating with the threaded portion of said lead screw;

said lead screw being rotatable relative to said grooved block to cause relative axial movement between said lead screw and said grooved block by the engagement of the threaded portions thereof;

a plurality of recesses formed in the respective sides walls of said grooves of said grooved block for containing hydrostatic support fluid flowing from said outlets from said second set of internal passages formed within said lead screw;

and a distributor valve formed circumferentially about the longitudinal axis of said lead screw, said distributor valve having a plurality of longitudinal passages formed therein, one end of said longitudinal passages in said distributor valve being connected with a hydrostatic fluid pressure source, said distributor valve further including a plurality of radial passages extending outwardly from said longitudinal passages in said distributor valve in the direction of the grooves in said ground block;

said longitudinal passages formed in said lead screw adapted to be communicated with said radial passages formed in said distributor valve when said longitudinal passages are adjacent said recesses formed in the side walls of said grooves, whereby hydrostatic fluid pressure can be distributed to said recesses to provide an even pressure to be maintained between the threads and the grooves, with the hydrostatic fluid pressure supply to a given longitudinal passage being cut off when said passage moves away from said recesses during rotation of said lead screw.

* * * * *